US006798547B2

(12) United States Patent
Wilson et al.

(10) Patent No.: US 6,798,547 B2
(45) Date of Patent: Sep. 28, 2004

(54) PROCESS FOR HOLOGRAPHIC MULTIPLEXING

(75) Inventors: William L. Wilson, Longmont, CO (US); Mark R. Ayres, Boulder, CO (US); Curt Shuman, Colorado Springs, CO (US); Kevin R. Curtis, Longmont, CO (US)

(73) Assignee: Inphase Technologies, Inc., Longmont, CO (US)

(*) Notice: Subject to any disclaimer, the term of this patent is extended or adjusted under 35 U.S.C. 154(b) by 0 days.

(21) Appl. No.: 10/201,357

(22) Filed: Jul. 22, 2002

(65) Prior Publication Data

US 2003/0067639 A1 Apr. 10, 2003

Related U.S. Application Data

(60) Provisional application No. 60/328,331, filed on Oct. 9, 2001.

(51) Int. Cl.[7] ............................................. G03H 1/10
(52) U.S. Cl. .......................... 359/10; 359/11; 359/22; 359/24; 365/125; 365/216
(58) Field of Search ............................ 359/10, 11, 22, 359/24, 25; 365/125, 216, 234

(56) References Cited

U.S. PATENT DOCUMENTS

| | | | | |
|---|---|---|---|---|
| 5,638,193 A | * | 6/1997 | Trisnadi | 359/11 |
| 5,703,705 A | | 12/1997 | Curtis et al. | |
| 5,719,691 A | | 2/1998 | Curtis et al. | |
| 5,874,187 A | | 2/1999 | Colvin et al. | |
| 5,892,601 A | | 4/1999 | Curtis et al. | |
| 5,932,045 A | | 8/1999 | Campbell et al. | |
| 5,943,145 A | * | 8/1999 | Curtis | 359/22 |
| 6,018,402 A | | 1/2000 | Campbell et al. | |
| 6,020,985 A | * | 2/2000 | McLeod | 359/22 |
| 6,103,454 A | | 8/2000 | Dhar et al. | |
| 6,157,473 A | * | 12/2000 | Jang | 359/22 |
| 6,191,875 B1 | | 2/2001 | Curtis et al. | |
| 2002/0071145 A1 | * | 6/2002 | Roh | 359/35 |

FOREIGN PATENT DOCUMENTS

| | | |
|---|---|---|
| JP | 11-242424 | 9/1999 |
| WO | WO 99/57719 | 11/1999 |

OTHER PUBLICATIONS

H. J. Coufal et al., (Eds.) "Holographic Data Storage", Springer–Verlag 2000, pp. 35–47, 53–55, 103–105.
H. J. Coufal et al., (Eds.) "Holographic Data Storage", Springer–Verlag 2000, p. 22.
Dhar, L. (Jun./Jul. 2001). "A New Venture in Holographic Storage," *The Industrial Physicist* pp. 26–27.
Dhar, L. et al. (Apr. 1999). "Recording Media That Exhibit High Dynamic Range for Digital Holographic Data Storage," *Optics Letters* 24(7):487–489.
Redfield, S. "Tamarack Optical Head Holographic Storage" In *Holographic Data Storage*. Coufal, H. J. et al. eds. Springer. pp. 343–357.
Saito, K. and Horimai, H. (1998). "Holographic 3–D Disk Using In–Line Face–to–Face Recording,". Optical Media Laboratory, Sony Corporation, Tokyo, Japan and Comets Corporation, Tokyo, Japan. pp. 162/WC3–1–164/WC3–3.
Zhou, G. et al. "Beam Deflectors and Spatial Light Modulators for Holographic Storage Application" In *Holographic Data Storage*. Coufal, H. J. et al. eds. Springer. pp. 241–257.

* cited by examiner

*Primary Examiner*—Leo Boutsikaris
(74) *Attorney, Agent, or Firm*—Morrison & Foerster LLP (57) ABSTRACT

A method of recording holograms includes: generating a first signal-beam from a signal-beam source and a first reference beam from a reference-beam source; recording a first hologram in a holographic medium from an interference between the first signal beam and the first reference beam; shifting the reference-beam source after the act of recording the first hologram; generating a second signal beam from the signal-beam source and a second reference beam from the reference-beam source after the act of shifting the reference-beam source following the recording of the first hologram; and recording a second hologram in the holographic medium from an interference between the second signal beam and the second reference beam.

74 Claims, 6 Drawing Sheets

PROCESS FOR HOLOGRAPHIC MULTIPLEXING

CROSS-REFERENCE TO RELATED APPLICATIONS

This application claims the benefit of provisional application 60/328,331, filed Oct. 9, 2001.

BACKGROUND OF THE INVENTION

1. Field of Invention

The present invention relates to data storage generally and more particularly to holographic data storage.

2. Description of Related Art

A variety of multiplexing methods have been developed to take advantage of the large storage capacity of holographic media including angle multiplexing, peristrophic multiplexing, wavelength multiplexing, phase coded multiplexing, shift multiplexing, and spatial multiplexing. (*Holographic Data Storage*, H. J. Coufal, D. Psaltis, and G. T. Sincerbox, (eds.), Springer-Verlag 2000.) These methods have also been used in combination to achieve higher performance (e.g, angle and peristrophic multiplexing). In many cases, however, these methods have been developed without a substantial appreciation for the practical requirements associated with the configuration of a manufacturable storage product. Mechanical tolerances corresponding to the system's requirements for error-free recovery of data are often difficult to achieve or prohibitively expensive for methods that are theoretically feasible.

For example, conventional shift multiplexing and tilt multiplexing (U.S. Pat. No. 5,703,705) were originally conceived as relatively easy-to-implement methods for multiplexing holograms by moving the media. While conceptually simple, practical mechanical implementation of these methods has proved difficult in many operational settings. Access of individual holograms may require movement of a massive object, (e.g., the piece of media) both quickly (e.g., with sub-msec timing) and accurately (e.g., with sub-micron tolerances).

Therefore, there is a need for developing multiplexing methods for holographic storage systems to achieve high storage capacities in simple-to-implement mechanical geometries more consistent with realistic optical storage devices and current limitations for drive designs.

SUMMARY OF INVENTION

In one embodiment of the present invention, a method of recording holograms includes: generating a first signal beam from a signal-beam source and a first reference beam from a reference-beam source; recording a first hologram in a holographic medium from an interference between the first signal beam and the first reference beam; shifting the reference-beam source after the act of recording the first hologram; generating a second signal beam from the signal-beam source and a second reference beam from the reference-beam source after the act of shifting the reference-beam source following the recording of the first hologram; and recording a second hologram in the holographic medium from an interference between the second signal beam and the second reference beam.

According to one aspect of this embodiment, the method may further include: shifting the holographic medium after the act of recording the second hologram; generating a third signal beam from the signal-beam source and a third reference beam from the reference-beam source after the act of shifting the holographic medium following the recording of the second hologram; and recording a third hologram in a holographic medium from an interference between the third signal beam and the third reference beam. Additionally according to this aspect, the method may include: shifting the reference-beam source after the act of recording the third hologram; generating a fourth signal beam from the signal-beam source and a fourth reference beam from the reference-beam source after the act of shifting the holographic medium following the recording of the third hologram; and recording a fourth hologram in the holographic medium from an interference between the fourth signal beam and the fourth reference beam.

According to another aspect, shifting the reference-beam source may include shifting a reference-beam lens. According to another aspect, shifting the reference-beam source may include adjusting a reference-beam mirror that shifts a spherical origin for reference beams. According to another aspect, shifting the reference-beam source may include shifting for tilt selectivity.

In another embodiment of the present invention, an apparatus for recording holograms includes: a signal-beam source for generating signal beams; a reference-beam source for generating reference beams; a holographic medium for recording holograms; and a reference-beam-source drive for shifting the reference-beam source. An interference between a first signal beam and a first reference beam records a first hologram in the holographic medium.

This embodiment of the present invention may include aspects described above. According to another aspect, the apparatus may include a laser source and a data source for providing inputs to the reference-beam source and the signal-beam source. According to another aspect, the apparatus may include a holographic-medium drive for shifting the holographic medium. According to another aspect, the reference-beam source may include a reference-beam lens. According to another aspect, the reference-beam source may include a reference-beam mirror that shifts a spherical origin for reference beams. According to another aspect, the holographic medium may include reflective media.

In another embodiment of the present invention, a method of reading holograms includes: generating a first reference beam from a reference-beam source; reading a first hologram in a holographic medium from a diffraction of the first reference beam with the first hologram; shifting the reference-beam source after the act of reading the first hologram; generating a second reference beam from the reference-beam source after the act of shifting the reference-beam source following the reading of the first hologram; and reading a second hologram in the holographic medium from a diffraction of the second reference beam with the second hologram.

This embodiment of the present invention may include aspects described above. According to another aspect, the method may further include: shifting the holographic medium after the act of recording the second hologram; generating a third reference beam from the reference-beam source after the act of shifting the reference-beam source following the reading of the second hologram; and reading a third hologram in the holographic medium from a diffraction of the third reference beam with the third hologram. Additionally according to this aspect, the method may include: shifting the reference-beam source after the act of reading the third hologram; generating a fourth reference beam from the reference-beam source after the act of shifting the reference-beam source following the reading of the third hologram; and reading a fourth hologram in the holographic medium from a diffraction of the fourth reference beam with the fourth hologram.

According to another aspect, shifting the reference-beam source may include shifting a reference-beam lens. According to another aspect, shifting the reference-beam source may include adjusting a reference-beam mirror that shifts a spherical origin for reference beams. According to another aspect, reading the holograms may include using an aperture in a reconstruction arm of the holograms. According to another aspect, shifting the reference-beam source may include shifting for tilt selectivity.

In another embodiment of the present invention, an apparatus for reading holograms includes: a holographic medium with holograms recorded therein; a reference-beam source for generating reference beams to read the holograms recorded in the holographic medium; a reference-beam-source drive for shifting the reference-beam source. A diffraction between a first reference beam and a first hologram in the holographic medium generates a first signal beam.

This embodiment of the present invention may include aspects described above. According to another aspect, the apparatus may further include a laser source and a data source for providing inputs to the reference-beam source. According to another aspect, the apparatus may further include a holographic-medium drive for shifting the holographic medium. According to another aspect, the reference-beam source may include a reference-beam lens. According to another aspect, the reference-beam source may include a reference-beam mirror that shifts a spherical origin for reference beams. According to another aspect, the apparatus may include an aperture in a reconstruction arm of the apparatus for aperture selectivity. According to another aspect, the holographic medium may include reflective media.

The present invention enables simplified multiplexing methods and corresponding mechanical systems for holographic reading and recording. Large-scale motions of heavyweight system elements (e.g., holographic medium) can be combined with fine-scale motions of lightweight system elements (e.g., a lens in a reference-beam source) in order to record or read a large number of holograms while avoiding burdensome system requirements.

DETAILED DESCRIPTION OF EXEMPLARY EMBODIMENTS

Figure 1:
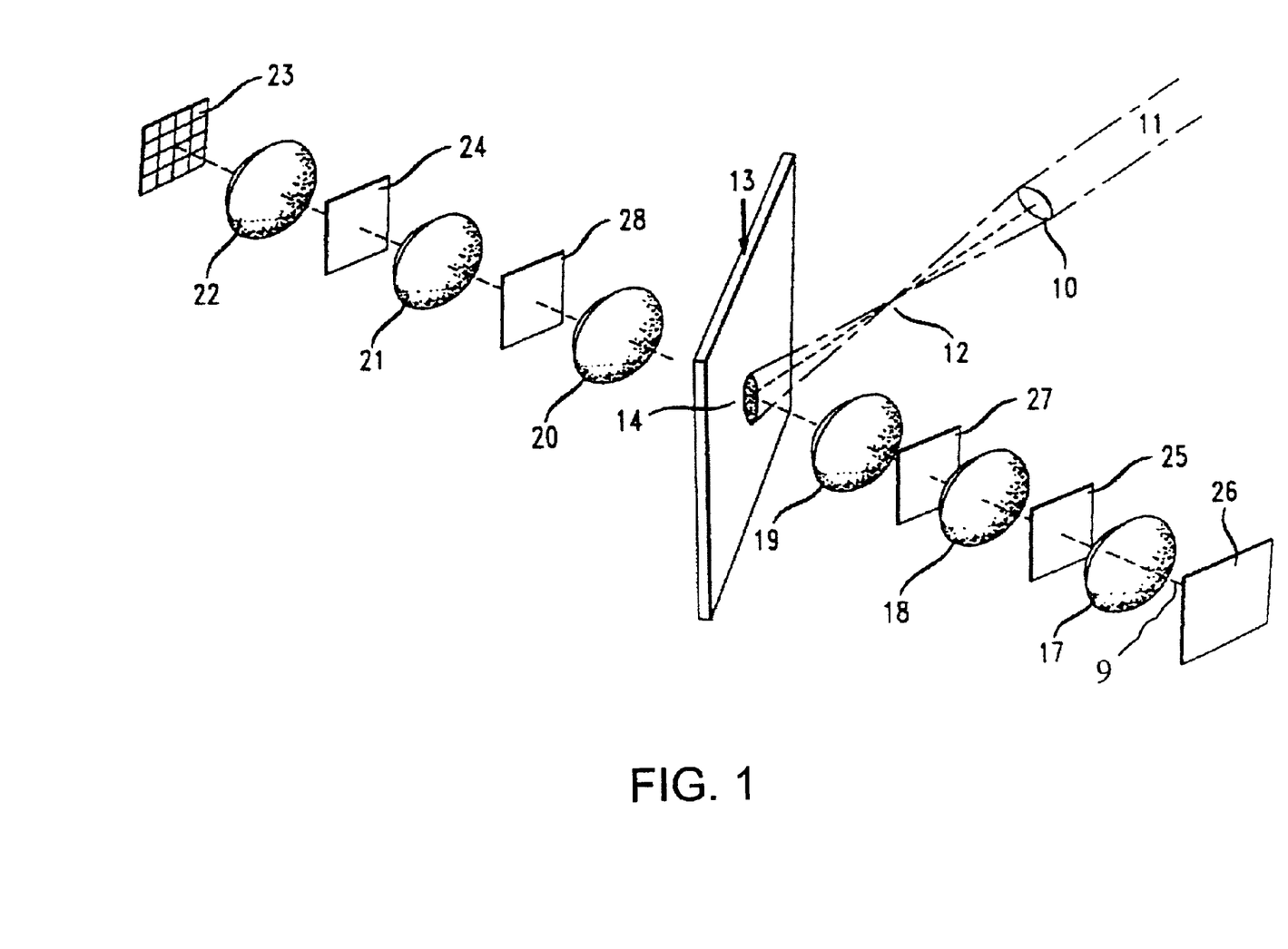
FIG. 1 shows an apparatus for recording holograms.

FIG. 1 shows an apparatus for recording holograms as described in U.S. Pat. No. 5,703,705, which is incorporated by reference herein. A reference beam 11 is produced at a cylindrical lens 10. A corresponding lens focus 12 at a distance d from a recording medium 13 produces a reference beam spot 14 in the medium 13. The spot size corresponding to the reference beam 11 has an area sufficient to cover the signal beam spot corresponding to a signal beam 9. The signal beam 9 is produced by illumination of a spatial light modulator (SLM) 26, which may allow tailoring of individual holograms for experimental purposes. A Fourier transform of the signal beam 9 is produced in spot 14 by a first lens series 17-18-19 in a 4F configuration (i.e., a first spacing 17-26 and a second spacing 19-14 equal to the focal distance, and a third spacing 17-18 and a fourth spacing 18-19 equal to the sum of focal distances of the lens pairs). In this embodiment readout from a second lens series 20-21-22 in a 4F configuration results in a reconstructed image at a detector 23.

Equipment variations may be made according to conventional practice. For example, the lens 10 may be a spherical lens. Elimination of a lens in each of the lens series 17-18-19, 20-21-22 with the remaining lenses arranged in a 4F configuration substitutes image recording and continues to produce a reconstructed image at the detector 23. A filter 25 consisting of a mask with an aperture at the Fourier plane can be used to permit passage of only the zeroth diffraction order. A random phase diffuser in contact with the spatial light modulator 26 or at the image plane 27 in the signal beam may be used to smear out the Fourier transform and to improve fidelity. An image plane filter 28 may be used for aperture selection in accordance with U.S. Pat. No. 5,892,601, which is incorporated by reference herein. Noise from other sources may be avoided by spatial filtering at a plane 24.

According to the present invention, multiplexing methods are combined for movement of the lens 10 as well a the medium 13. For example, in one embodiment the medium 13 is moved along the Bragg axis to address partially overlapping holograms according to a first shift multiplexing scheme, and the lens 10 is then moved in relatively small-scale motions to multiplex a small number of holograms according to a second shift multiplexing scheme.

Figure 2:
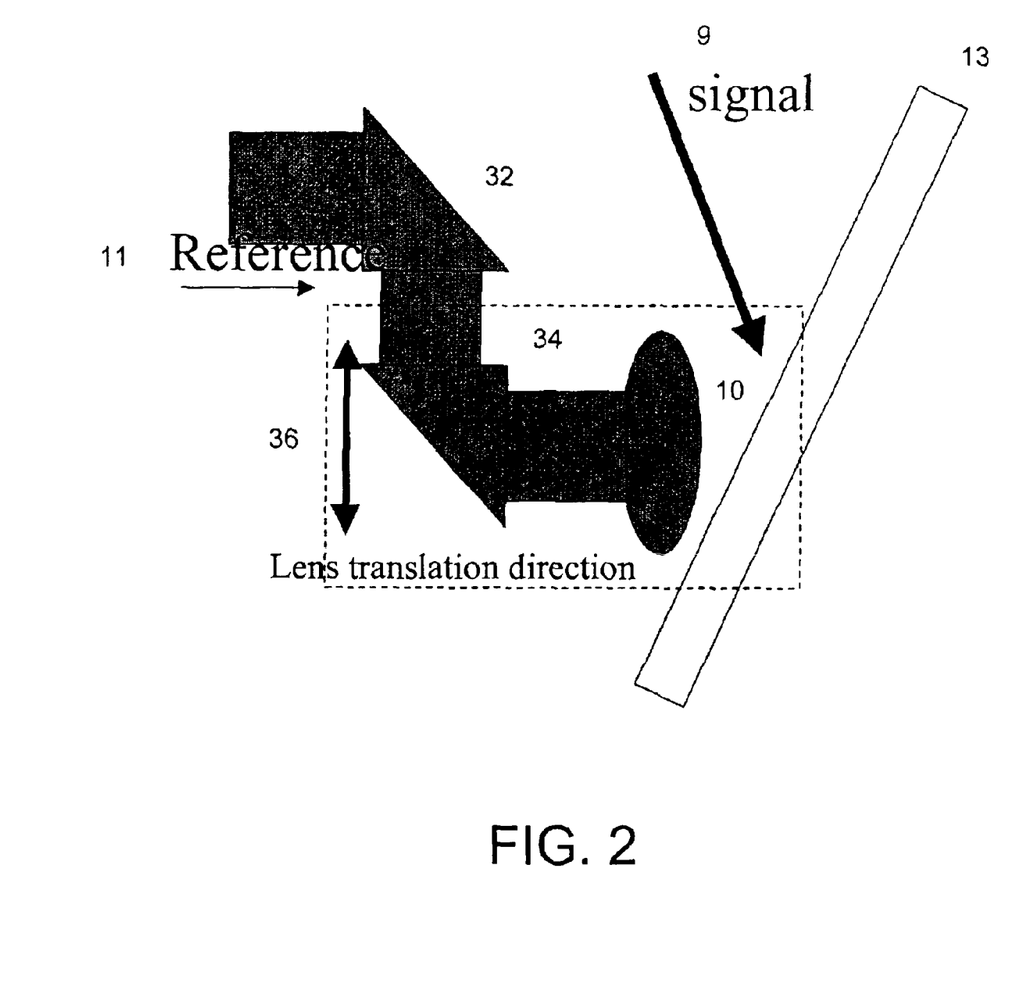
FIG. 2 show an embodiment of the present invention for adjusting the position of the lens in the apparatus shown in FIG. 1.

Adjustment of the medium 13 can be made by conventional means as disclosed in U.S. Pat. No. 5,703,705. FIG. 2 shows an embodiment of the present invention for adjusting the position of the lens 10 for focusing the reference beam 11 onto the medium 13 where a hologram is recorded by interference with the signal beam 9. A first steering prism 32 and a second steering prism 34 are used to redirect the reference beam 11. A subsystem 36, which includes the second prism 34 and the lens is movable in one or more translation directions. For example, the lens 10 can be shifted along or orthogonal to the Bragg axis. In this embodiment the lens 10 and the second prism 34 are translated together to minimize distortion of the spherical wave reference. (Note that the designations first and second are used herein for labeling purposes only and are not intended to be further limiting. The designation first, whether in space or in time, does not imply a second item.)

In this way the present invention enables a de-coupling motion in a shift multiplexed geometry into coarse and fine movements in a way that may ease mechanical design of a commercial drive. That is, the embodiment shown in FIGS. 1 and 2 provides a mechanism that can make a relatively long complex move (i.e., movement of the medium 13) to a location and recover or store a large number of holograms with a less complicated motion (i.e., movement of the lens 10) before moving to the next location. This strategy can be used, for example, to implement skip sorted recording which is needed for recording high fidelity holograms in typical saturable materials. In addition to simplifying the system this method may allow much faster operation in some mechanical designs by de-coupling the mechanical motions into course and fine movements.

In a specifically preferred embodiment, holograms were recorded using an imaging system as described in FIG. 1 with the reference beam focussing system of FIG. 2. A 150 mW Nd:YAG laser was used as the source of the signal beam 9 and the reference beam 11. The laser beam was split and spatially filtered to produce a first plane wave, which was focused through a 0.33 NA lens to generate the reference beam 11 and a second plane wave as the input for the spatial light modulator 26 to generate the signal beam 9. The reference beam focus 12 was 5–6 mm from the media 13 whose thickness was 0.750 mm. The results for a single recorded hologram are shown in FIG. 3, which illustrates is the diffracted intensity of the hologram (in arbitrary units (AU)) as a function of lens position (in microns ($\mu$m)) from a nominal set point.

Figure 3:
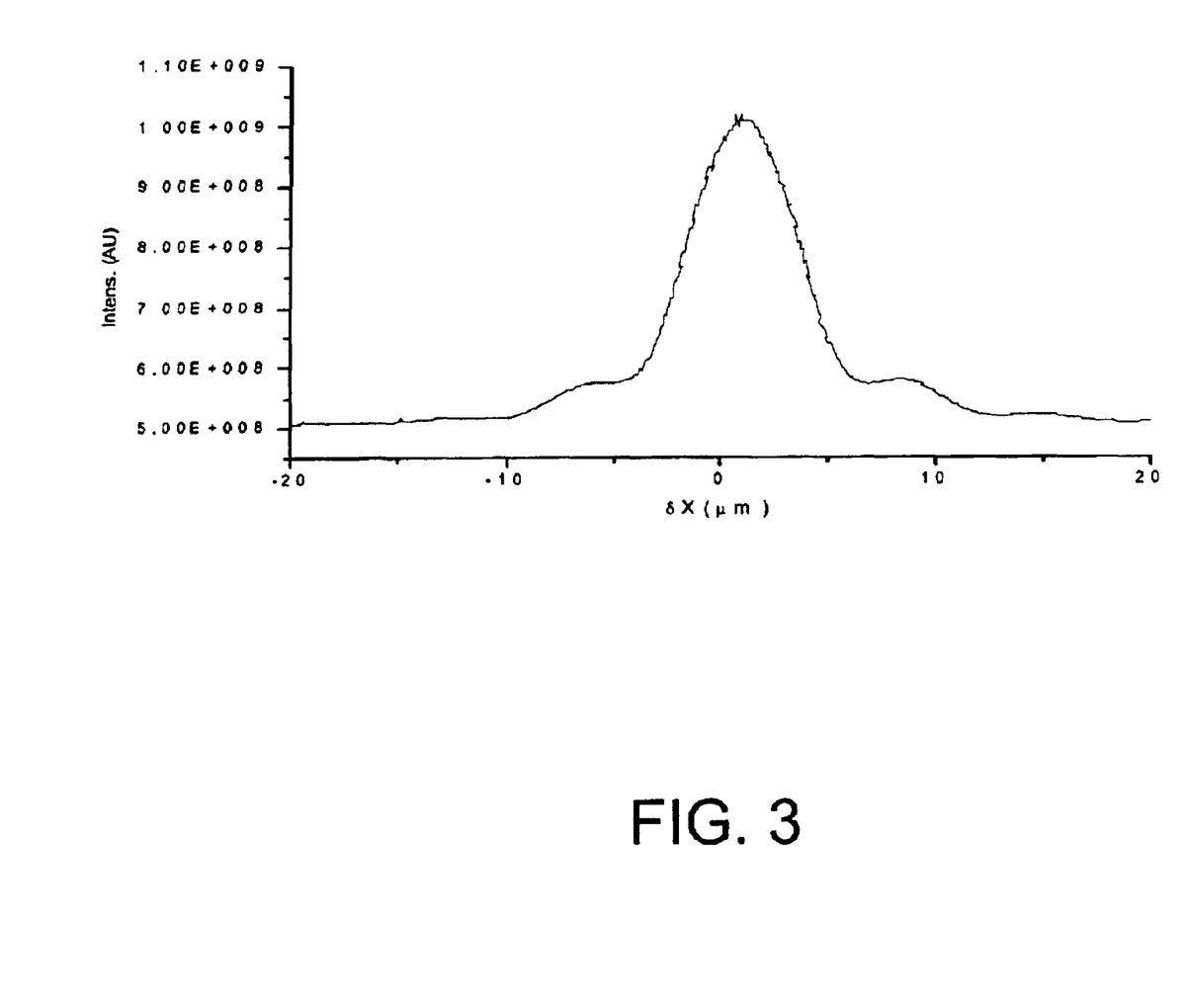
FIG. 3 shows an example of a single hologram recording.
Figure 4:
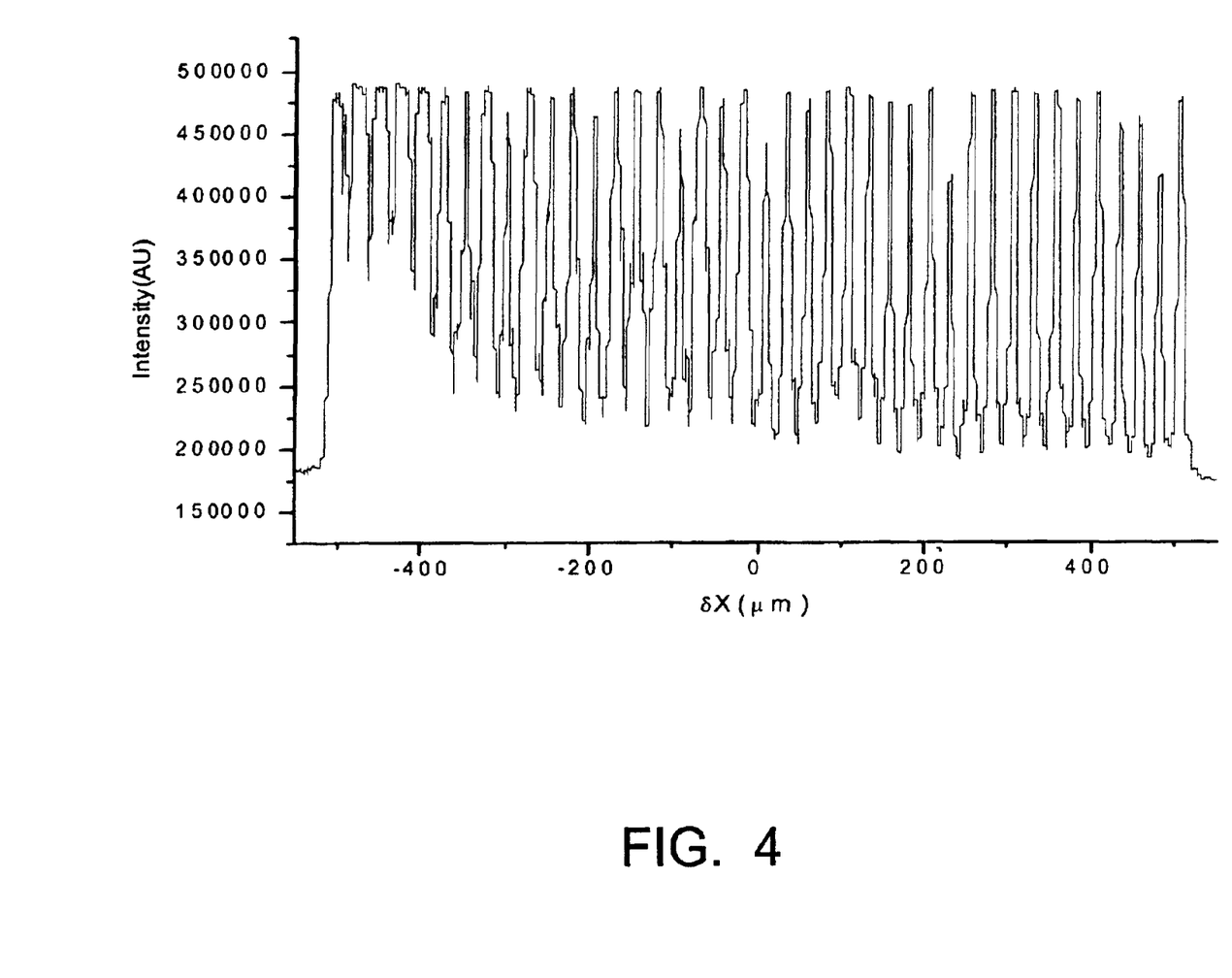
FIG. 4 shows an example of a row of holograms.
Figure 5:
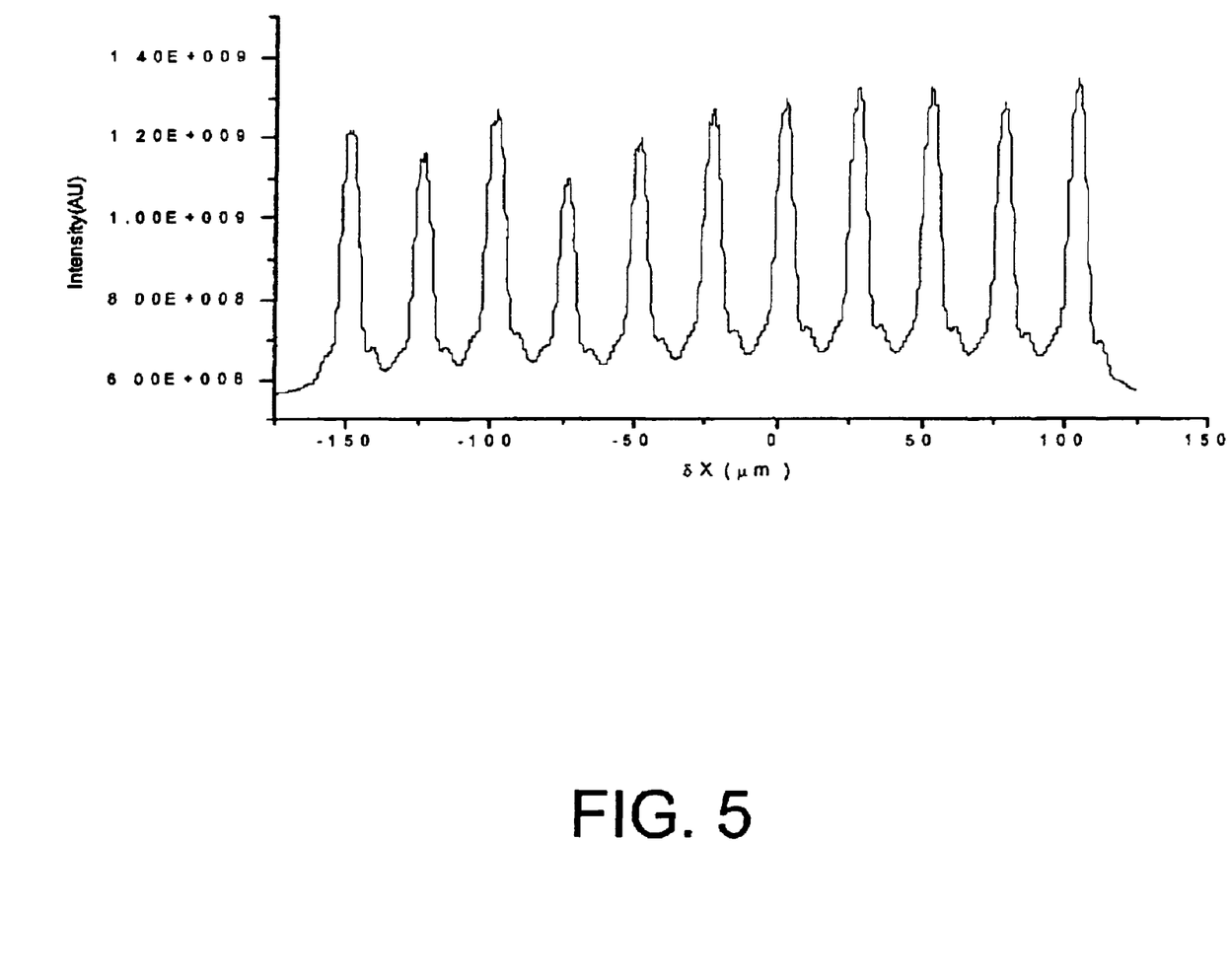
FIG. 5 shows an expanded view of a portion of FIG. 4.

The sensitivity for storing multiple holograms is often characterized by the second Bragg null, which in FIG. 3 is at a lens shift of ~11 $\mu$m. For this embodiment, FIG. 4 illustrates the storage of a single row of 51 holograms, where the holograms are stored at 20 $\mu$m shifts of the lens position. An expanded view is also shown in FIG. 5. By continuing this process, one could easily access 50–100 holograms in a single location by moving the lens 10 before moving the media 13 to the next position. Then the storage of a single row as illustrated in FIG. 4 can be replicated along the horizontal axis where each grouping of holograms corresponds to a single position of the media 13 and multiple positions of the lens 10.

In addition to recording holograms, embodiments of the present invention may likewise be directed towards reading a pre-recorded hologram. Although the above example has been discussed with a focus towards recording holograms, those skilled in the art will easily see the direct applicability towards reading holograms.

As illustrated by this example, the present invention enables multiplexing on multiple scales in a way that simplifies the mechanical system required for a drive. The geometry effectively de-couples motion in a shift multiplexed system into coarse and fine movements. First a long coarse move is made (e.g., by moving the media 13) to a location where a large number of holograms can be stored or accessed. Then individual holograms at this location are stored or accessed by fine movement of the origin of the spherical (or cylindrical) reference wave (e.g., by moving the lens 10). Thus, to a large extent requirements for mechanical timing and positioning can be directed towards a potentially lightweight element such as the lens 10 rather than a heavier element such as the media 13.

Other embodiments of the present invention result similarly from well-known generalizations and variations of the holographic recording apparatus shown in FIG. 1. For example, the reference beam 11 may be considered as an output of a reference-beam source, and likewise the signal beam 9 may be considered as an output of a signal-beam source. In some configurations the reference beam 11 and the data beam 9 are described respectfully as a reference arm and a signal arm of a system that includes a laser, a beam splitter, a data source such as an SLM, and a holographic medium. The laser generates a laser beam that is split into two arms (i.e., reference arm and signal arm), the data arm receives data values from the data source, and an interference between the data arm and the and the reference arm records a hologram in the holographic medium. In a reciprocal operation for reading holograms, the laser generates a laser beam that provides a reference (or probe) arm so that a diffraction between the reference arm and a stored hologram in the holographic medium generates a corresponding signal (or reconstruction) arm. (FIG. 1, p. 22, *Holographic Data Storage*, H. J. Coufal, D. Psaltis, and G. T. Sincerbox, (eds.), Springer-Verlag 2000.)

The example shown above with reference to FIGS. 1–5 illustrates an embodiment that is based on a conventional shift multiplexing system. Alternative embodiments may incorporate features of tilt multiplexing (U.S. Pat. No. 5,703,705) or aperture multiplexing (U.S. Pat. No. 5,892,601), either separately or in combination. In these embodiments selectivity in the non-Bragg direction (i.e., the step direction in U.S. Pat. No. 5,703,705) is used to gain higher density by partially overlapping the holograms. For example, tilt multiplexing can be achieved by tilting the plane of incidence, which is formed by the reference beam 11 and the signal beam 9, relative to the medium 13 so that a Bragg component is introduced in the non-Bragg direction. Aperture multiplexing can be achieved by including an aperture in the reconstruction arm when reading holograms. For example, when a Fourier transform (i.e., a spectral decomposition) is recorded in the medium 13, then the aperture can be positioned for maximal sensitivity in an image plane (e.g., at the image plane filter 28 or the detector 23). Alternatively, when an image is recorded in the medium 13, then the aperture can be positioned in a Fourier transform plane.

Additionally, embodiments of the present invention may desirably incorporate reflective media as in U.S. patent application "Method and Apparatus for Phase Correlation Holographic Drive", Ser. No. 10/146,085, filed May 13, 2002, and incorporated by reference. Using reflective media (e.g., for the media 13 in FIG. 1) may allow for a more compact device design and the possibility of double sided media whereby disk capacity or card capacity can be doubled.

Figure 6:
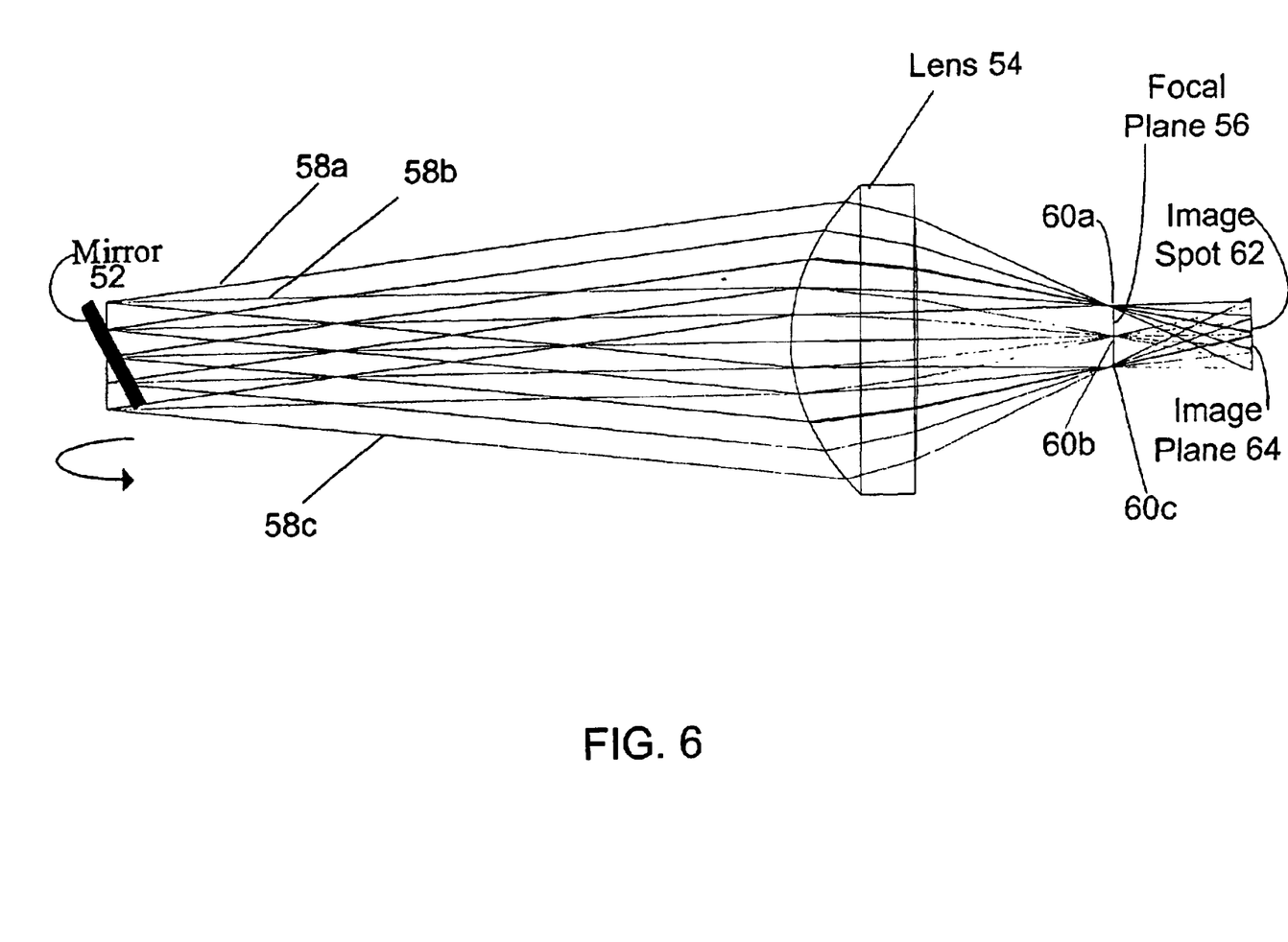
FIG. 6 shows an embodiment of the present invention.

Other embodiments of the present invention may include beam steering, for example, to shift the spherical wave origin in the case where the reference beam is produced by a spherical lens. In this way the reference beam can be shifted without moving the lens so that the spot size remains substantially uniform. For example, FIG. 6 shows an embodiment that uses a steering mirror 52 and spherical lens 54 to enable fine movement of the reference origin and fine movement of the beam spot with little change in the beam spot size. The dimensions of these elements may vary according to the specific geometry of an application and the availability of off-the-shelf components. For example, a specific prototype was developed where the mirror 52 had a diameter of 1 cm and the lens 54 had a diameter of 2.5 cm.

The rotation of the mirror 52 determines the orientation of a planar beam so that it passes through the lens 54 and is focussed to a point in a focal plane 56 and then to an image spot in an image plane 64. In FIG. 6 three planar orientations 58a, 58b, 58c are shown with three corresponding focal points 60a, 60b, 60c in the focal plane 56 and an equivalent image spot 62 in the image plane 64. In this embodiment, a small fast galvo-mirror (i.e., as the steering mirror 52) would be the only moving element required for the fine motion with the gross moves as described above. In this way the present invention enables holographic recording with fine adjustment of the reference beam without moving the lens as is the embodiment shown in FIG. 2.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method of recording holograms, comprising:
   generating a first signal beam from a signal-beam source and a first reference beam from a reference-beam source;
   recording a first hologram in a holographic medium from an interference between the first signal beam and the first reference beam;
   shifting the reference-beam source after the act of recording the first hologram, wherein shifting the reference-beam source includes shifting for shift selectivity in a plane of the holographic medium;
   generating a second signal beam from the signal-beam source and a second reference beam from the reference-beam source after the act of shifting the reference-beam source following the recording of the first hologram; and
   recording a second hologram in the holographic medium from an interference between the second signal beam and the second reference beam, wherein the first hologram and the second hologram are overlapping.

2. A method as claimed in claim 1, further comprising:
   shifting the holographic medium after the act of recording the second hologram;
   generating a third signal beam from the signal-beam source and a third reference beam from the reference-beam source after the act of shifting the holographic medium following the recording of the second hologram; and
   recording a third hologram in a holographic medium from an interference between the third signal beam and the third reference beam.

3. A method as claimed in claim 2, further comprising:
   shifting the reference-beam source after the act of recording the third hologram, wherein shifting the reference-beam source includes shifting for shift selectivity in the plane of the holographic medium;
   generating a fourth signal beam from the signal-beam source and a fourth reference beam from the reference-beam source after the act of shifting the holographic medium following the recording of the third hologram; and
   recording a fourth hologram in the holographic medium from an interference between the fourth signal beam and the fourth reference beam, wherein the third hologram and the fourth hologram are overlapping.

4. A method as claimed in claim 1, wherein shifting the reference-beam source includes shifting a reference-beam lens.

5. A method as claimed in claim 1, wherein shifting the reference-beam source includes adjusting a reference-beam mirror that shifts a spherical origin for reference beams.

6. A method as claimed in claim 1, wherein shifting the reference-beam source includes shifting in a direction substantially along a Bragg axis.

7. An apparatus for recording holograms, comprising:
   a signal-beam source for generating signal beams;
   a reference-beam source for generating reference beams;
   a holographic medium for recording holograms; and
   a reference-beam-source drive for shifting the reference-beam source for shift selectivity in a plane of the holographic medium, wherein
   an interference between a first signal beam and a first reference beam records a first hologram in the holographic medium,
   after shifting the reference-beam source, an interference between a second signal beam and a second reference beam records a second hologram in the holographic medium, and
   the first hologram and the second hologram are overlapping.

8. An apparatus as claimed in claim 7, further comprising:
   a laser source and a data source for providing inputs to the reference-beam source and the signal-beam source.

9. An apparatus as claimed in claim 7, further comprising:
   a holographic-medium drive for shifting the holographic medium.

10. An apparatus as claimed in claim 7, wherein the reference-beam source includes a reference-beam lens.

11. An apparatus as claimed in claim 7, wherein the reference-beam source includes a reference-beam mirror that shifts a spherical origin for reference beams.

12. An apparatus as claimed in claim 7, wherein the holographic medium includes reflective media.

13. A method of reading holograms, comprising:
    generating a first reference beam from a reference-beam source;
    reading a first hologram in a holographic medium from a diffraction of the first reference beam with the first hologram;
    shifting the reference-beam source after the act of reading the first hologram, wherein shifting the reference-beam source includes shifting for shift selectivity in a plane of the holographic medium;
    generating a second reference beam from the reference-beam source after the act of shifting the reference-beam source following the reading of the first hologram; and
    reading a second hologram in the holographic medium from a diffraction of the second reference beam with the second hologram, wherein the first hologram and the second hologram are overlapping.

14. A method as claimed in claim 13, further comprising:
    shifting the holographic medium after the act of recording the second hologram;
    generating a third reference beam from the reference-beam source after the act of shifting the reference-beam source following the reading of the second hologram; and
    reading a third hologram in the holographic medium from a diffraction of the third reference beam with the third hologram.

15. A method as claimed in claim 14, further comprising:
    shifting the reference-beam source after the act of reading the third hologram, wherein shifting the reference-beam source includes shifting for shift selectivity in the plane of the holographic medium;
    generating a fourth reference beam from the reference-beam source after the act of shifting the reference-beam source following the reading of the third hologram; and
    reading a fourth hologram in the holographic medium from a diffraction of the fourth reference beam with the fourth hologram, wherein the third hologram and the fourth hologram are overlapping.

16. A method as claimed in claim 13, wherein shifting the reference-beam source includes shifting a reference-beam lens.

17. A method as claimed in claim 13, wherein shifting the reference-beam source includes adjusting a reference-beam mirror that shifts a spherical origin for reference beams.

18. A method as claimed in claim 13, wherein shifting the reference-beam source includes shifting in a direction substantially alone a Bragg axis.

19. A method as claimed in claim 13, wherein shifting the reference-beam source includes shifting in a direction substantially orthogonal to a Bragg axis.

20. An apparatus for reading holograms, comprising:
a holographic medium with holograms recorded therein;
a reference-beam source for generating reference beams to read the holograms recorded in the holographic medium; and
a reference-beam-source drive for shifting the reference-beam source for shift selectivity in a plane of the holographic medium, wherein
a diffraction between a first reference beam and a first hologram in the holographic medium generates a first signal beam,
after shifting the reference-beam source, a diffraction between a second reference beam and a second hologram in the holographic medium generates a second signal beam, and
the first hologram and the second hologram are overlapping.

21. An apparatus as claimed in claim 20, further comprising:
a laser source for providing inputs to the reference-beam source.

22. An apparatus as claimed in claim 20, further comprising:
a holographic-medium drive for shifting the holographic medium.

23. An apparatus as claimed in claim 20, wherein the reference-beam source includes a reference-beam lens.

24. An apparatus as claimed in claim 20, wherein the reference-beam source includes a reference-beam mirror that shifts a spherical origin for reference beams.

25. An apparatus as claimed in claim 20, wherein shifting the reference-beam source includes shifting in a direction substantially along a Bragg axis.

26. An apparatus as claimed in claim 20, wherein the holographic medium includes reflective media.

27. A method as claimed in claim 1, wherein shifting the reference-beam source includes shifting in a direction substantially orthogonal to a Bragg axis.

28. An apparatus as claimed in claim 7, wherein shifting the reference-beam source includes shifting in a direction substantially along a Bragg axis.

29. An apparatus as claimed in claim 7, wherein shifting the reference-beam source includes shifting in a direction substantially orthogonal to a Bragg axis.

30. An apparatus as claimed in claim 20, wherein shifting the reference-beam source includes shifting in a direction substantially orthogonal to a Bragg axis.

31. A method of recording holograms, comprising:
generating a first signal beam from a signal-beam source and a first reference beam from a reference-beam source;
recording a first hologram in a holographic medium from an interference between the first signal beam and the first reference beam;
shifting the reference-beam source after the act of recording the first hologram, wherein shifting the reference-beam source includes shifting for tilt selectivity;
generating a second signal beam from the signal-beam source and a second reference beam from the reference-beam source after the act of shifting the reference-beam source following the recording of the first hologram; and
recording a second hologram in the holographic medium from an interference between the second signal beam and the second reference beam.

32. A method as claimed in claim 31, further comprising:
shifting the holographic medium after the act of recording the second hologram;
generating a third signal beam from the signal-beam source and a third reference beam from the reference-beam source after the act of shifting the holographic medium following the recording of the second hologram; and
recording a third hologram in a holographic medium from an interference between the third signal beam and the third reference beam.

33. A method as claimed in claim 32, further comprising:
shifting the reference-beam source after the act of recording the third hologram, wherein shifting the reference-beam source includes shifting for tilt selectivity;
generating a fourth signal beam from the signal-beam source and a fourth reference beam from the reference-beam source after the act of shifting the holographic medium following the recording of the third hologram; and
recording a fourth hologram in the holographic medium from an interference between the fourth signal beam and the fourth reference beam.

34. A method as claimed in claim 31, wherein shifting the reference-beam source includes shifting a reference-beam lens.

35. A method as claimed in claim 31, wherein shifting the reference-beam source includes adjusting a reference-beam mirror that shifts a spherical origin for reference beams.

36. An apparatus for recording holograms, comprising:
a signal-beam source for generating signal beams;
a reference-beam source for generating reference beams;
a holographic medium for recording holograms; and
a reference-beam-source drive for shifting the reference-beam source, wherein
shifting the reference-beam source includes shifting for tilt selectivity, and
an interference between a first signal beam and a first reference beam records a first hologram in the holographic medium.

37. An apparatus as claimed in claim 36, further comprising:
a laser source and a data source for providing inputs to the reference-beam source and the signal-beam source.

38. An apparatus as claimed in claim 36, further comprising:
a holographic-medium drive for shifting the holographic medium.

39. An apparatus as claimed in claim 36, wherein the reference-beam source includes a reference-beam lens.

40. An apparatus as claimed in claim 36, wherein the reference-beam source includes a reference-beam mirror that shifts a spherical origin for reference beams.

41. An apparatus as claimed in claim 36, wherein the holographic medium includes reflective media.

42. A method of reading holograms, comprising:
generating a first reference beam from a reference-beam source;
reading a first hologram in a holographic medium from a diffraction of the first reference beam with the first hologram;
shifting the reference-beam source after the act of reading the first hologram, wherein shifting the reference-beam source includes shifting for tilt selectivity;

generating a second reference beam from the reference-beam source after the act of shifting the reference-beam source following the reading of the first hologram; and reading a second hologram in the holographic medium from a diffraction of the second reference beam with the second hologram.

43. A method as claimed in claim 42, further comprising:

shifting the holographic medium after the act of recording the second hologram;

generating a third reference beam from the reference-beam source after the act of shifting the reference-beam source following the reading of the second hologram; and reading a third hologram in the holographic medium from a diffraction of the third reference beam with the third hologram.

44. A method as claimed in claim 43, further comprising:

shifting the reference-beam source after the act of reading the third hologram, wherein shifting the reference-beam source includes shifting for tilt selectivity;

generating a fourth reference beam from the reference-beam source after the act of shifting the reference-beam source following the reading of the third hologram; and reading a fourth hologram in the holographic medium from a diffraction of the fourth reference beam with the fourth hologram.

45. A method as claimed in claim 42, wherein shifting the reference-beam source includes shifting a reference-beam lens.

46. A method as claimed in claim 42, wherein shifting the reference-beam source includes adjusting a reference-beam mirror that shifts a spherical origin for reference beams.

47. An apparatus for reading holograms, comprising:

a holographic medium with holograms recorded therein;

a reference-beam source for generating reference beams to read the holograms recorded in the holographic medium; and a reference-beam-source drive for shifting the reference-beam source, wherein shifting the shifting the reference-beam source includes shifting for tilt selectivity, and a diffraction between a first reference beam and a first hologram in the holographic medium generates a first signal beam.

48. An apparatus as claimed in claim 47, further comprising:

a laser source and a data source for providing inputs to the reference-beam source.

49. An apparatus as claimed in claim 47, further comprising:

a holographic-medium drive for shifting the holographic medium.

50. An apparatus as claimed in claim 47, wherein the reference-beam source includes a reference-beam lens.

51. An apparatus as claimed in claim 47, wherein the reference-beam source includes a reference-beam mirror that shifts a spherical origin for reference beams.

52. An apparatus as claimed in claim 47, wherein the holographic medium includes reflective media.

53. A method of recording holograms, comprising:

generating a first signal beam from a signal-beam source and a first reference beam from a reference-beam source;

recording a first hologram in a holographic medium from an interference between the first signal beam and the first reference beam;

shifting the reference-beam source after the act of recording the first hologram;

generating a second signal beam from the signal-beam source and a second reference beam from the reference-beam source after the act of shifting the reference-beam source following the recording of the first hologram; and recording a second hologram in the holographic medium from an interference between the second signal beam and the second reference beam, wherein recording the second hologram includes using an aperture in a recording arm of the second hologram for aperture selectivity.

54. A method as claimed in claim 53, further comprising:

shifting the holographic medium after the act of recording the second hologram;

generating a third signal beam from the signal-beam source and a third reference beam from the reference-beam source after the act of shifting the holographic medium following the recording of the second hologram; and recording a third hologram in a holographic medium from an interference between the third signal beam and the third reference beam.

55. A method as claimed in claim 54, further comprising:

shifting the reference-beam source after the act of recording the third hologram;

generating a fourth signal beam from the signal-beam source and a fourth reference beam from the reference-beam source after the act of shifting the holographic medium following the recording of the third hologram; and recording a fourth hologram in the holographic medium from an interference between the fourth signal beam and the fourth reference beam, wherein recording the fourth hologram includes using the aperture in a recording arm of the fourth hologram for aperture selectivity.

56. A method as claimed in claim 53, wherein shifting the reference-beam source includes shifting a reference-beam lens.

57. A method as claimed in claim 53, wherein shifting the reference-beam source includes adjusting a reference-beam mirror that shifts a spherical origin for reference beams.

58. An apparatus for recording holograms, comprising:

a signal-beam source for generating signal beams;

a reference-beam source for generating reference beams;

a holographic medium for recording holograms;

an aperture in a recording arm of the apparatus for aperture selectivity when recording holograms; and a reference-beam-source drive for shifting the reference-beam source, wherein an interference between a first signal beam and a first reference beam records a first hologram in the holographic medium.

59. An apparatus as claimed in claim 58, further comprising:

a laser source and a data source for providing inputs to the reference-beam source and the signal-beam source.

60. An apparatus as claimed in claim 58, further comprising:

a holographic-medium drive for shifting the holographic medium.

61. An apparatus as claimed in claim 58, wherein the reference-beam source includes a reference-beam lens.

62. An apparatus as claimed in claim 58, wherein the reference-beam source includes a reference-beam mirror that shifts a spherical origin for reference beams.

63. An apparatus as claimed in claim 58, wherein the holographic medium includes reflective media.

64. A method of reading holograms, comprising:
generating a first reference beam from a reference-beam source;
reading a first hologram in a holographic medium from a diffraction of the first reference beam with the first hologram;
shifting the reference-beam source after the act of reading the first hologram;
generating a second reference beam from the reference-beam source after the act of shifting the reference-beam source following the reading of the first hologram; and
reading a second hologram in the holographic medium from a diffraction of the second reference beam with the second hologram, wherein reading the second hologram includes using an aperture in a reconstruction arm of the second hologram for aperture selectivity.

65. A method as claimed in claim 64, further comprising:
shifting the holographic medium after the act of recording the second hologram;
generating a third reference beam from the reference-beam source after the act of shifting the reference-beam source following the reading of the second hologram; and
reading a third hologram in the holographic medium from a diffraction of the third reference beam with the third hologram.

66. A method as claimed in claim 65, further comprising:
shifting the reference-beam source after the act of reading the third hologram;
generating a fourth reference beam from the reference-beam source after the act of shifting the reference-beam source following the reading of the third hologram; and
reading a fourth hologram in the holographic medium from a diffraction of the fourth reference beam with the fourth hologram, wherein reading the fourth hologram includes using the aperture in a reconstruction arm of the fourth hologram for aperture selectivity.

67. A method as claimed in claim 64, wherein shifting the reference-beam source includes shifting a reference-beam lens.

68. A method as claimed in claim 64, wherein shifting the reference-beam source includes adjusting a reference-beam mirror that shifts a spherical origin for reference beams.

69. An apparatus for reading holograms, comprising:
a holographic medium with holograms recorded therein;
a reference-beam source for generating reference beams to read the holograms recorded in the holographic medium;
an aperture in a reconstruction arm of the apparatus for aperture selectivity when reading holograms; and
a reference-beam-source drive for shifting the reference-beam source, wherein a diffraction between a first reference beam and a first hologram in the holographic medium generates a first signal beam.

70. An apparatus as claimed in claim 69, further comprising:
a laser source and a data source for providing inputs to the reference-beam source.

71. An apparatus as claimed in claim 69, further comprising:
a holographic-medium drive for shifting the holographic medium.

72. An apparatus as claimed in claim 69, wherein the reference-beam source includes a reference-beam lens.

73. An apparatus as claimed in claim 69, wherein the reference-beam source includes a reference-beam mirror that shifts a spherical origin for reference beams.

74. An apparatus as claimed in claim 69, wherein the holographic medium includes reflective media.

* * * * *